United States Patent Office 2,863,784
Patented Dec. 9, 1958

2,863,784

HYDROXYLATED CONJUGATED DIOLEFIN POLYMERS IN DRYING OIL COMPOSITIONS AND A METHOD OF PREPARING THE SAME

John C. Hillyer, Bartlesville, Okla., assignor to Phillips Petroleum Company, a corporation of Delaware No Drawing. Application July 3, 1952
Serial No. 297,165

27 Claims. (Cl. 106—252)

This invention relates to new drying oil compositions. In a further aspect to this invention relates to drying oil compositions containing hydroxylated conjugated diolefin polymers. A further aspect of this invention relates to novel coating compositions containing hydroxylated conjugated diolefin polymers. A still further object of this invention relates to the production of inks. A further aspect of this invention relates to methods of producing these various compositions.

By the various aspects of this invention one or more of the following objects will be attained.

An object of this invention is to provide a method for the production of new and novel drying oil compositions. A further object of this invention is to provide a method for the production of coating compositions and a still further object is to provide a method for the preparation of printing inks. A further object of this invention is to provide new compositions of matter containing hydroxylated conjugated diolefin polymers in combination with glyceride oils of the drying and semi-drying types.

Other objects and advantages of this invention will be apparent to one skilled in the art upon reading this specification.

According to the invention a hydroxylated conjugated diolefin polymer is mixed with a glyceride oil and the mixture is heated. More particularly, a hydroxylated conjugated diolefin polymer, having an oxygen content in the range between one and 15 percent by weight and preferably between 5 and 12 percent by weight, is mixed with a glyceride oil and the mixture is heated at a temperature in the range between 400 and 650° F., preferably between 500 and 600° F., for a period usually not to exceed 10 hours, and more frequently in the range between 2 and 6 hours, until a composition of the desired viscosity is obtained. A heating time of one hour is usually required. It is generally preferred to agitate the mixture and to operate in an inert atmosphere such as nitrogen, carbon dioxide, or the like.

The products obtained by the process of this invention are suitable for use in various coating compositions. They dry to smooth, impervious films when exposed to the air and show excellent resistance to weathering. In general, if materials containing free hydroxy groups are employed in coating compositions, the resulting compositions have poor water resistance. Contrary to this general observation, the products of the present invention give coating compositions having good water resistance. The coatings retain high gloss and possess a softness or flexibility which is visibly unimpaired after being subjected to accelerated weathering tests. They are suitable as coatings for wood and are especially useful on metal surfaces and other objects where a flexible coating is desired.

The hydroxylated conjugated diolefin polymers employed for preparing the drying oil compositions herein described are prepared from conjugated diolefin polymers by reaction with hydrogen peroxide or a compound capable of yielding hydrogen peroxide, with or without a solvent, in the presence of a catalyst such as formic acid. The conjugated diolefin polymers can be prepared by any polymerization methods known to the art, such as mass or emulsion polymerization, and can range from liquid to rubbery materials. Homopolymers of conjugated diolefins containing from four to six carbon atoms per molecule and copolymers of these conjugated diolefins with copolymerizable materials, such as styrene, methyl-substituted styrenes, acrylonitrile, methacrylonitrile, methyl methacrylate, and the like, are within the scope of the materials designated as conjugated diolefin polymers which can be hydroxylated and then employed in the drying oil compositions of this invention. By whatever means the conjugated diolefin polymers are prepared, it is essential that the hydroxylated materials obtained therefrom be soluble in glyceride oils. The process employed for the production of the hydroxylated polymers is similar to that described for the production of hydroxylated liquid polybutadiene in a copending application of Hillyer and Edmonds, filed January 2, 1951, Serial No. 204,062, now Patent 2,692,892.

The glyceride oils which are applicable for preparation of the compositions of this invention are of the types generally known as drying and semi-drying oils. They include linseed oil, soybean oil, cottonseed oil, corn oil, peanut oil, and the like. It has frequently been preferred to employ hydroxylated liquid polybutadiene as the other component of the drying oil compositions since it can be easily manufactured from abundant and readily available materials.

An amount of hydroxylated conjugated diolefin polymer in the range from 2 to 25 percent by weight, based on the weight of the glyceride oil, is generally employed in the drying oil compositions of this invention. The amount of hydroxylated ploymer used is governed, at least in part, by the molecular weight of the polymer. In general, as the molecular weight of the hydroxylated polymer is increased, the concentration in the drying oil composition is decreased in order that the finished product will have a viscosity in the desired range for coating compositions.

The drying oil compositions of this invention which are applicable in paint and varnish mixtures have a viscosity which is generally in the range between Q on the Gardner scale to a point just short of the gel point. It is generally preferred to use lower viscosity compositions for paints than for varnishes. The viscosity desired in the compositions is determined partially by the amount of thinner that is to be employed.

Subsequent to heating the hydroxylated conjugated diolefin polymer with the glyceride oil, the mixture is cooled and a thinner is added. Conventional thinners for paint and varnish are applicable, i. e., coal tar hydrocarbons, petroleum distillates, turpentine fractions, and the like. After the thinner has been mixed with the drying oil composition, driers are then added. Conventional driers such as lead, cobalt, and manganese, in the form of the naphthenate salts, are employed. The mixture is finally warmed, generally to 200 to 250° F., and agitated to facilitate solution of the driers.

The following examples are illustrative of the invention and the manner in which it may be practiced.

*Example I*

A sample of liquid polybutadiene prepared by sodium catalyzed polymerization, having a viscosity of 488 Saybolt Furol seconds at 100° F. and a Gardner color of 10, was hydroxylated in chloroform with 20 percent aqueous hydrogen peroxide in the presence of formic acid. The ratio of these reactants was three $C_4$ equivalents of the liquid polybutadiene per mol of anhydrous hydrogen peroxide per mol of formic acid. The product had an oxygen content of 12 percent by weight.

Thirteen parts by weight of the hydroxylated liquid polybutadiene prepared as described above was mixed with 87 parts by weight of linseed oil. The mixture was stirred and a stream of carbon dioxide was passed over its surface continuously. The temperature was raised to 540° F. and held there until a string about 1½ inches long could be drawn from a drop of the product cooled to near room temperature on a watch glass. This heating period required three hours and the product had a viscosity of Z-7 on the Gardner scale. While the composition was cooling it was thinned with mineral spirits and driers of cobalt and manganese, in the form of their naphthenate salts, were then added. The mixture was heated to 200-250° F. and stirred in order to facilitate solution of the driers. The amount of each drier was such that the composition without the thinner contained 0.08 percent cobalt and 0.02 percent manganese.

Fourteen parts by weight of the same sample of liquid polybutadiene that was employed for preparation of the hydroxylated product described above was mixed with 86 parts by weight of linseed oil and carbon dioxide was passed over the surface continuously as the mixture was stirred and heated to a temperature of 580-600° F. for two hours. This was the time required until a string about 1½ inches long could be drawn from a drop of the product cooled to near room temperature on a watch glass. This product had a viscosity of Z-4 on the Gardner scale. While the composition was cooling it was thinned with mineral spirits and driers of cobalt and manganese, in the form of their napthenate salts, as described above were added.

Linseed oil was heated in an atmosphere of carbon dioxide to a temperature of 580-600° F. for a period of 3.9 hours. At the end of this period the product had a Gardner viscosity of Z-3. It was thinned with mineral spirits and driers added as before.

The above-described compositions contained from 33 to 50 percent by weight of thinner.

Various tests were made using the three materials described above as coating compositions, these tests being:

(1) *Drying time.*—Test panels 1¾ in. wide by 4 in. long, made of 31 gage tin plate were washed thoroughly with benzene immediately prior to being coated. Application of the coating was made by pouring the composition over the test panel and allowing the excess coating to drain off by supporting the panel in a nearly vertical position. The tests were carried out in an air conditioned room at a controlled temperature away from direct rays of the sun.

Two stages of drying were recorded for each film by testing the film about an inch below the upper edge of the drained films: (a) Tack free, which is the time required for the film to dry to a condition where no coating will adhere to the finger when touched lightly; (b) Rub dry, which is the time required for the film to dry to a condition where nothing more than an easily removed finger print results when the film is subjected to a moderate rubbing pressure.

(2) *Sward hardness.*—The hardness value is taken as the Sward Rocker reading of the film at the end of the initial 24-hour drying period (reading on glass equal to 100 oscillations).

(3) *Water resistance.*—Panels were prepared as described above and allowed to dry for 48 hours. The upper end of the drained films were then immersed in distilled water for 18 hours at room temperature. The panels were removed from the water, wiped carefully, and allowed to dry at room temperature. The time required for whitening to disappear was noted.

(4) *Accelerated weathering.*—Panels for this test were prepared by applying three coats of varnish with a small brush to edge-cut, sanded, white pine panels 2⅝ in. wide, 7 in. long, and ¼ in. thick. During the two-day drying periods between coating applications the panels were allowed to drain vertically. Just prior to the application of the third coating the panels were sanded lightly. A seven-day drying period was allowed between the application of the final coating and the beginning of the accelerated weathering tests.

The accelerated weathering tests were carried out in an Atlas, twin arc, alternating current weatherometer. The black panel temperature varied from 140 to 160° F. The panels were rotated about the arcs for 17 minutes without spray and three minutes with a spray of tap water directly on them.

The following results were obtained:

|  | Hydroxy-polybu-tadiene-Linseed Oil | Polybu-tadiene-Linseed Oil | Linseed Oil |
|---|---|---|---|
| Drying time, hours: |  |  |  |
| Tack free | 3.5 | 2.3 | 1.8 |
| Rub dry | 4.5 | 3.5 | 5.5 |
| Sward hardness | 3 | 5 | 5 |
| Water resistance: |  |  |  |
| Rating [1] | 5 | 7 | 6 |
| White loss, hours | 4 | 4 | 4 |
| Accelerated weathering [1] | 10 | 7 | 6 |

[1] Arbitrary scale from 0 to 10, 10 indicating unaffected.

The hydroxypolybutadiene-linseed oil composition gave a coating which showed excellent results in the accelerated weathering test, good water resistance, and retained its high gloss. The coating using the hydroxylated polymer was much more flexible than the others.

Furthermore, superior printing ink compositions can also be prepared using the hydroxylated conjugated diolefin polymers disclosed above. In such a case, hydroxylated polymers containing one to 20% oxygen are used. These polymers provide fast drying, tack, and adhesion and these properties are particularly valuable in present-day printing inks. For this purpose it is also necessary to add certain supplementary materials in addition to the drying oil which is combined with the hydroxylated polymer. For instance, natural and synthetic resins are added to give hardness to the ink. Of the natural resins, rosin, dammar, copal, tragacanth and kauri are often used. In general, however, I prefer to use synthetic resins, such as the alkyd, coumarone, and phenolic resins because there is less variation in the physical properties.

The compositions above described have a stringy consistency and would not be suitable in that form for high speed printing in that the ink would have a tendency to creep. Short inks, which have the consistency of lard, are preferred, and for this purpose I add, as shorteners, non-drying metallic soaps such as palmitates, stearates or oleates of aluminum, zinc, magnesium, calcium or resinates, particularly those of aluminum. The addition of these metallic soaps also serves to prevent settling of the pigments.

As many possible embodiments may be made of this invention without departing from the scope thereof, it is to be understood that all matter herein set forth is to be interpreted as illustrative and not in a limiting sense.

I claim:

1. As a new drying oil composition, a heat-treated mixture of at least one hydroxylated conjugated diolefin polymer and glyceride oils of the drying and semi-drying types.

2. The composition of claim 1 in which the oxygen content of the hydroxylated polymer is in the range between one and 15 percent by weight.

3. The composition of claim 1 in which the ratio of hydroxylated polymer to glyceride oil is 2:100 to 25:100 parts by weight.

4. The composition of claim 1 in which the hydroxylated polymer is hydroxylated liquid polybutadiene.

5. The composition of claim 1 in which the glyceride oil is selected from the group consisting of linseed oil, soybean oil, cottonseed oil, corn oil, and peanut oil.

6. A coating composition comprising a heat-treated mixture of at least one hydroxylated conjugated diolefin polymer and glyceride oils of the drying and semi-drying types, thinner, and a drier.

7. The coating composition of claim 6 in which the hydroxylated polymer is selected from the group consisting of hydroxylated homopolymers of conjugated diolefins containing 4 to 6 carbon atoms per molecule, hydroxylated copolymers of conjugated diolefins containing 4 to 6 carbon atoms per molecule, and hydroxylated copolymers of said conjugated diolefins and compounds selected from the group consisting of styrene, methyl styrene, acrylonitrile, methacrylonitrile, and methyl methacrylate.

8. The coating composition of claim 6 in which the thinner comprises from one-third to one-half by weight of said composition.

9. A coating composition comprising a heat-treated mixture of 13 parts by weight of hydroxylated liquid polybutadiene and 87 parts by weight of linseed oil, mineral spirits and cobalt and manganese naphthenate driers.

10. The method of preparing a drying oil composition comprising heat-treating a mixture of hydroxylated conjugated diolefin polymer and a glyceride oil selected from the group consisting of drying and semi-drying types, cooling the resulting composition, mixing thinner with said composition, and adding driers to said composition.

11. The method of claim 10 in which the hydroxylated polymer is hydroxylated polybutadiene and the glyceride oil is linseed oil.

12. The method of claim 10 in which said heating is carried out in an inert atmosphere.

13. The method of claim 10 in which the hydroxylated polymer is selected from the group consisting of hydroxylated homopolymers of conjugated diolefins containing 4 to 6 carbon atoms per molecule, hydroxylated copolymers of conjugated diolefins containing 4 to 6 carbon atoms per molecule, and hydroxylated copolymers of conjugated diolefins containing 4 to 6 carbon atoms and compounds selected from the group consisting of styrene, methyl styrene, acrylonitrile, methacrylonitrile, and methyl methacrylate.

14. The method of preparing a drying oil composition comprising adding to a glyceride oil selected from the group consisting of drying and semi-drying oils from 2 to 25 percent by weight of a hydroxylated conjugated polymer having an oxygen content in the range between one and 15 percent by weight, heating this mixture to a temperature between 400 and 650° F. for a period of one to 10 hours, cooling said mixture to room temperature, adding a thinner to said mixture, adding driers to said mixture, and warming said mixture to facilitate solution of the driers.

15. The method of preparing a drying oil composition comprising adding to a glyceride oil selected from the group consisting of drying and semi-drying oils from 2 to 25 percent by weight of a hydroxylated conjugated polymer having an oxygen content in the range between 5 and 12 percent by weight, heating this mixture to a temperature between 500 and 600° F. for a period of 2 to 6 hours, cooling said mixture to room temperature, adding thinner to said mixture, adding driers to said mixture, and warming said mixture to 200 to 250° F. to facilitate solution of the driers.

16. The method of claim 14 in which the hydroxylated polymer is hydroxylated polybutadiene and the glyceride oil is linseed oil.

17. The method of claim 14 in which said heating is carried out in an inert atmosphere.

18. As a new drying oil composition, a mixture of glyceride oil of the drying and semi-drying type and, based on said oil, 2 to 25 percent by weight of at least one hydroxylated conjugated diolefin polymer, said mixture having been heated at 400 to 650° F. for 1 to 10 hours.

19. The composition of claim 18 in which the oxygen content of the hydroxylated polymer is in the range between 1 and 15 percent by weight.

20. The composition of claim 18 in which the hydroxylated polymer is hydroxylated liquid polybutadiene.

21. The composition of claim 18 in which the glyceride oil is selected from the group consisting of linseed oil, soybean oil, cottonseed oil, corn oil, and peanut oil.

22. The composition of claim 18 in which the hydroxylated polymer is selected from the group consisting of hydroxylated homopolymers of conjugated diolefins containing 4 to 6 carbon atoms per molecule, hydroxylated copolymers of at least two conjugated diolefins containing 4 to 6 carbon atoms per molecule, and hydroxylated copolymers of said conjugated diolefins and compounds selected from the group consisting of styrene, methyl styrene, acrylonitrile, methacrylonitrile, and methyl methacrylate.

23. The method of preparing a drying oil composition comprising mixing a glyceride oil of the drying and semi-drying types and, based on the weight of said oil, 2 to 25 percent by weight of a hydroxylated conjugated diene polymer, and heating said mixture at a temperature of 400 to 650° F. for 1 to 10 hours.

24. The method of claim 23 in which the hydroxylated polymer is hydroxylated polybutadiene and the glyceride oil is linseed oil.

25. The method of claim 23 in which said heating is carried out in an inert atmosphere.

26. The method of claim 23 in which the hydroxylated polymer is selected from the group consisting of hydroxylated homopolymers of conjugated diolefins containing 4 to 6 carbon atoms per molecule, hydroxylated copolymers of at least two conjugated diolefins containing 4 to 6 carbon atoms per molecule, and hydroxylated copolymers of said conjugated diolefins and compounds selected from the group consisting of styrene, methyl styrene, acrylonitrile, methacrylonitrile, and methyl methacrylate.

27. The method of preparing a drying oil composition comprising mixing a glyceride oil of the drying and semi-drying types and a hydroxylated conjugated diolefin polymer, and heating said mixture.

References Cited in the file of this patent

UNITED STATES PATENTS

| | | |
|---|---|---|
| 2,500,599 | Bergsteinsson | Mar. 14, 1950 |
| 2,516,590 | Pratt | July 25, 1950 |
| 2,523,609 | Bloch et al. | Sept. 26, 1950 |
| 2,555,927 | Himel | June 5, 1951 |
| 2,623,890 | Verley | Dec. 30, 1952 |
| 2,653,956 | Marhofer | Sept. 29, 1953 |
| 2,665,283 | Carlick | Jan. 5, 1954 |